UNITED STATES PATENT OFFICE.

ANTON JAHL, OF LINZ, GERMANY.

PROCESS OF MAKING PURE, HIGHLY-CONCENTRATED HYDROGEN PEROXID FROM THE PEROXID OF AN ALKALINE EARTH.

1,210,651.            Specification of Letters Patent.           Patented Jan. 2, 1917.

No Drawing.         Application filed April 25, 1913. Serial No. 763,568.

*To all whom it may concern:*

Be it known that I, ANTON JAHL, chemist, a subject of the Austrian Emperor, residing at 11 Kirchplatz, Linz-on-the-Rhine, Kingdom of Prussia, German Empire, have invented a new and useful Improvement in Processes of Making Pure, Highly-Concentrated Hydrogen Peroxid from the Peroxid of an Alkaline Earth; and I do hereby declare the following to be a full, clear, and exact description of the same.

In the process generally employed for making hydrogen peroxid barium peroxid is treated with dilute acids. Usually dilute hydrochloric acid is employed and sufficient sulfuric acid is gradually added to the solution to precipitate in the form of sulfate the barium dissolved by the hydrochloric acid. In this process most of the substances mixed with the commercial barium peroxid, such as lime, magnesia, iron, manganese and so on dissolve in the hydrogen peroxid solution. It has been proposed to add diluted phosphoric acid or soluble phosphates to the solution in such quantities that these admixtures are precipitated as phosphates. Complete precipitation can not, however, be obtained because these phosphates are to some extent soluble in dilute acids. Owing to dilute acids being employed the hydrogen peroxid obtained is also dilute and contains at most 3 to 4% $H_2O_2$. Moreover, for the reason mentioned above, it is never absolutely pure. To employ concentrated hydrochloric acid or sulfuric acid for decomposing the barium oxid is not possible for various reasons. Firstly, the concentrated acids react very slowly, and, secondly, the precipitated barium sulfate is so colloidal that it can not be readily filtered and washed; moreover, it always contains undecomposed barium peroxid the quantity of which increases the higher the concentration of the acids is chosen.

Now according to the present invention I employ not dilute, but concentrated, syrupy phosphoric acid. Both the dry as well as the hydrated barium peroxid are completely decomposed by concentrated phosphoric acid. An insoluble crystalline barium phosphate is formed which throws down all impurities, as lime, magnesia, aluminium, iron, manganese, silicic acid and the like. A very concentrated solution of hydrogen peroxid is simultaneously formed which contains 10 to 30% hydrogen peroxid ($H_2O_2$) according to the concentration of phosphoric acid which was employed. By carefully adding barium peroxid and stirring well, the solution can be entirely freed from phosphoric acid. The crystalline precipitate can be readily separated from the solution by decantation, suction or filtration and can be washed. Owing to the great purity of the hydrogen peroxid solution, the same can be further concentrated, almost without decomposition by evaporation *in vacuo*. The small quantities of wash water obtained when washing out the phosphates still contain some solution of hydrogen peroxid and can be added to fresh decomposing acid. By fractional washing, wash waters can be obtained which contain 8 to 15% hydrogen peroxid and which can be utilized. If it is desired to recover the phosphoric acid, the phosphate precipitate is treated with sulfuric acid and the barium sulfate is filtered from the phosphoric acid which has been liberated.

Phosphoric acid and sulfuric acid can, moreover, be jointly employed for decomposing the barium peroxid. In this case it is preferable first of all to decompose a certain quantity of barium peroxid with phosphoric acid and then to add to this mixture, while continually stirring the same, sulfuric acid and barium peroxid alternately. In proportion as the phosphoric acid becomes liberated, barium peroxid is added to the mixture. It is, however, preferable not to go beyond a ratio of 60 equivalent per cents. sulfuric acid to 40 equivalent per cents. phosphoric acid, since then the precipitate loses its granular nature and can not be readily filtered and washed.

Instead of free phosphoric acid being employed for carrying out the process, any phosphate, *e. g.* calcium phosphate, can be employed which is decomposed with sulfuric acid, the solution being thereupon employed, if need be after previously separating the precipitate, for decomposing the barium peroxid. The process can also be employed for producing concentrated hydrogen peroxid from calcium or magnesium peroxid.

An example will now be described wherein a solution of hydrogen peroxid having 16% hydrogen peroxid is obtained from barium peroxid containing 87% barium peroxid by means of phosphoric acid. It will be understood however that the degrees of concentration and relative quantities referred to in the example can be varied to suit requirements.

Example: 30 liters concentrated phosphoric acid of 1.7 density are mixed with 60 liters water in a vessel provided with means for stirring and cooling. The so obtained phosphoric acid contains 38.9 per cent. $H_3PO_4$ and is therefore concentrated. I then slowly add to this mixture, while keeping the same continually stirred 75% kilograms barium peroxid containing 87% barium peroxid ($BaO_2$), care being preferably taken that the temperature does not rise above 50° to 70° C. After all the barium peroxid has been added, the last traces of acid present in the mixture are neutralized by addition of any base, stirred for some time and then caused to run onto a suction-filter. The filtrate contains 16% hydrogen peroxid by weight. The small quantity of dissolved barium is precipitated before or after filtration by the careful addition of a sulfate or of sulfuric acid. The solution is completely free from impurities which could have a decomposing effect on the hydrogen peroxid. The latter is therefore very stable, can be kept for a long time without decomposing and consequently can withstand being transported a considerable distance.

The barium phosphate precipitate is carefully washed with water, the first concentrated wash water being collected separately from that obtained later. If the wash water is used instead of water for diluting the phosphoric acid, a more concentrated solution of hydrogen peroxid is obtained by the above described process, or less phosphoric acid and barium peroxid are admixed for the quantity of mixing water stated.

The barium phosphate is preferably decomposed with weak, dilute sulfuric acid, the phosphoric acid, if need be after previous concentration, being reëmployed for decomposing the barium peroxid.

I claim:
1. The process of making pure concentrated, stable hydrogen peroxid which consists in treating metal peroxids the metal of which gives difficultly soluble phosphates with a quantity of concentrated phosphoric acid sufficient for complete decomposition and separating the solution from the precipitate.

2. The process of making pure concentrated, stable hydrogen peroxid which consists in treating metal peroxids with a quantity of concentrated phosphoric acid and a quantity of an acid which yields with barium insoluble compounds or compounds soluble with difficulty, sufficient for complete decomposition of the metal peroxid and separating the solution from the precipitate.

3. The process of making pure concentrated, stable hydrogen peroxid which consists in first adding to concentrated phosphoric acid sufficient metal peroxid to cause the same to be entirely or almost entirely precipitated, then adding an acid which decomposes the precipitated phosphate and forms with the base of the peroxid an insoluble compound or a compound soluble with difficulty, and in adding additional metal peroxid in proportion as the free phosphoric acid forms.

4. The process of making pure concentrated, stable hydrogen peroxid which consists in treating metal peroxids, the metal of which gives difficultly soluble phosphates, with a quantity of concentrated phosphoric acid sufficient for complete decomposition while maintaining the temperature of the concentrated phosphoric acid below 70° C., and separating the liquid from the precipitate.

In testimony whereof I have signed my name to this specification in the presence of two subscribing witnesses.

ANTON JAHL.

Witnesses:
Louis Vandory,
Walther Has.